United States Patent
Matsubara

(10) Patent No.: US 7,526,134 B2
(45) Date of Patent: Apr. 28, 2009

(54) IMAGE PROCESSING APPARATUS, PROGRAM, RECORDING MEDIUM, AND DATA DECOMPRESSION METHOD

(75) Inventor: Akio Matsubara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 941 days.

(21) Appl. No.: 10/757,883

(22) Filed: Jan. 14, 2004

(65) Prior Publication Data

US 2004/0146206 A1    Jul. 29, 2004

(30) Foreign Application Priority Data

Jan. 14, 2003    (JP)    ............................. 2003-005517

(51) Int. Cl.
*G06K 9/36* (2006.01)

(52) U.S. Cl. .................... 382/232; 382/233; 382/240; 382/245; 382/246; 382/250; 345/543; 345/1.1; 375/122

(58) Field of Classification Search .................. 382/232, 382/233, 240, 245, 246, 305; 345/543, 1.1, 345/555; 375/122; 341/51
See application file for complete search history.

(56) References Cited

U.S. PATENT DOCUMENTS

| | | | |
|---|---|---|---|
| 7,110,608 B2 * | 9/2006 | Chan et al. | 382/239 |
| 2002/0018597 A1 * | 2/2002 | Kajiwara et al. | 382/233 |
| 2003/0001964 A1 * | 1/2003 | Masukura et al. | 348/441 |
| 2003/0044077 A1 | 3/2003 | Okada | |
| 2003/0068089 A1 * | 4/2003 | Sano et al. | 382/232 |
| 2003/0215012 A1 * | 11/2003 | Etoh et al. | 375/240.12 |
| 2004/0096110 A1 * | 5/2004 | Yogeshwar et al. | 382/239 |
| 2004/0120589 A1 * | 6/2004 | Lopresti et al. | 382/239 |
| 2005/0094870 A1 * | 5/2005 | Furukawa et al. | 382/155 |

FOREIGN PATENT DOCUMENTS

| | | |
|---|---|---|
| JP | H07-111596 | 4/1995 |
| JP | H09-069947 | 3/1997 |
| JP | 2000-059776 | 2/2000 |
| JP | 2000-358230 | 12/2000 |
| JP | 2001-223593 | 8/2001 |
| JP | 2002-344996 | 11/2002 |

OTHER PUBLICATIONS

Japanese Office Action for Appln. No. JP 2003-005517, mailed Sep. 25, 2007 (2 pages).

* cited by examiner

*Primary Examiner*—Matthew C Bella
*Assistant Examiner*—Ali Bayat
(74) *Attorney, Agent, or Firm*—Blakely, Sokoloff, Taylor & Zafman LLP

(57) ABSTRACT

An image processing apparatus includes a decompressing unit decompressing image data having a first data compression format, an obtaining unit obtaining a second data compression format that is applicable for decompression by another image processing apparatus, a re-compressing unit re-compressing the decompressed image data with the second data compression format obtained by the obtaining unit, and a transmitting unit transmitting the re-compressed image data to the other image processing apparatus.

17 Claims, 12 Drawing Sheets

DECOMPOSITION LEVEL 0

DECOMPOSITION LEVEL 1

DECOMPOSITION LEVEL 2

DECOMPOSITION LEVEL 3

FIG.10

| SOC | MH | 00 | 01 | 02 | 03 | 04 | 10 | 11 | 12 | 13 | 14 | 20 | 21 | 22 | 23 | 24 | 30 | 31 | 32 | 33 | 34 | 40 | 41 | 42 | 43 | 44 | 50 | 51 | 52 | 53 | 54 | EOC | ns.
IMAGE PROCESSING APPARATUS, PROGRAM, RECORDING MEDIUM, AND DATA DECOMPRESSION METHOD

The present application claims priority to the corresponding Japanese Application No. 2003-005517 filed on Jan. 14, 2003, the entire contents of which are hereby incorporated by reference.

BACKGROUND OF THE INVENTION

1. Field of the Invention

The present invention relates to an image processing apparatus, a program, a recording medium, and a data decompression method.

2. Description of the Related Art

In recent years, the demand for obtaining an image with extreme fineness is growing due to the advances in image input technology and image output technology. As an example of an image input apparatus, in the area of digital cameras, a high performance CCD (Charge Coupled Device) providing 300 million or more pixels is employed for products sold in a common price range due to the accelerated decrease in the cost of the CCD. Furthermore, the number of pixels is expected to continue increasing.

In the area of image output apparatuses/image display apparatuses including, for example, products that provide hard copies such as laser printers, inkjet printers, and sublimation printers, and products that provide soft copies such as CRT (Cathode Ray Tube) and flat panel displays such as LCD (Liquid Crystal Display) or PDP (Plasma Display Panel), the increase in the fineness of images and the decrease in the cost of products are remarkable.

Due to the advent of high performance/low cost image input/output apparatuses in the market, the use of images of extreme fineness are spreading among the general public, and the demand for images of extreme fineness is expected to increase further in other areas. The advance in network related technologies such as the Internet and the personal computer is the cause for accelerating this trend. Particularly, the rapid growth in the use of mobile devices such as mobile phones and lap top computers allows high quality images to be transmitted and/or received at any given location.

Under these circumstances, image compression/decompression technology, being employed for simplifying the handling of high quality images, is expected to provide higher performance and more functions in the future.

In recent years, a new image compression format referred to as JPEG 2000, which can decompress high quality images compressed at high compression rates, is being standardized for satisfying such expectations. With the JPEG 2000, compression and decompression can be performed in a small memory environment that employs a process of dividing an image into rectangular areas (tiles). That is, each of the tiles serves as a basic unit for performing compression and decompression, to thereby allow the compression/decompression process to be performed on each tile independently. Furthermore, with the JPEG 2000, an image file can be divided into a low resolution data and a high resolution data.

An example of a method of using image files compressed with the JPEG 2000 format is described below. For example, image files compressed with the JPEG 2000 format may be stored in a server computer for allowing a client computer to access the server computer and extract only low resolution data from one of the image files for processing the low resolution data as a thumbnail display. By using this method, network traffic during transmittal from the server computer to the client computer can be reduced and the time for performing the thumbnail display process can be shortened.

However, computers installed with an application capable of decompressing JPEG 2000 compressed image files are limited. That is, there is a problem that a client computer, having no JPEG 2000 decompression function, is unable to perform an image display process even where accessible to a server computer having JPEG 2000 compressed image files stored therein.

Furthermore, although uncompressed image files could be transmitted to the client computer having no JPEG 2000 decompression function, such transmittal of uncompressed image files will increase the amount of network traffic.

SUMMARY OF THE INVENTION

An image processing apparatus, program, recording medium, and data decompression method are described. In one embodiment, the image processing apparatus comprises a decompressing unit to decompress image data having a first data compression format, an obtaining unit to obtain a second data compression format that is applicable for decompression by another image processing apparatus, a re-compressing unit to re-compress the decompressed image data with the second data compression format obtained by the obtaining unit, and a transmitting unit to transmit the re-compressed image data to the other image processing apparatus.

BRIEF DESCRIPTION OF THE DRAWINGS

FIG. 10 is an explanatory view showing a compressed code according to a divided image in compliance with a JPEG 2000 algorithm;

DESCRIPTION OF THE PREFERRED EMBODIMENTS

Figure 1:
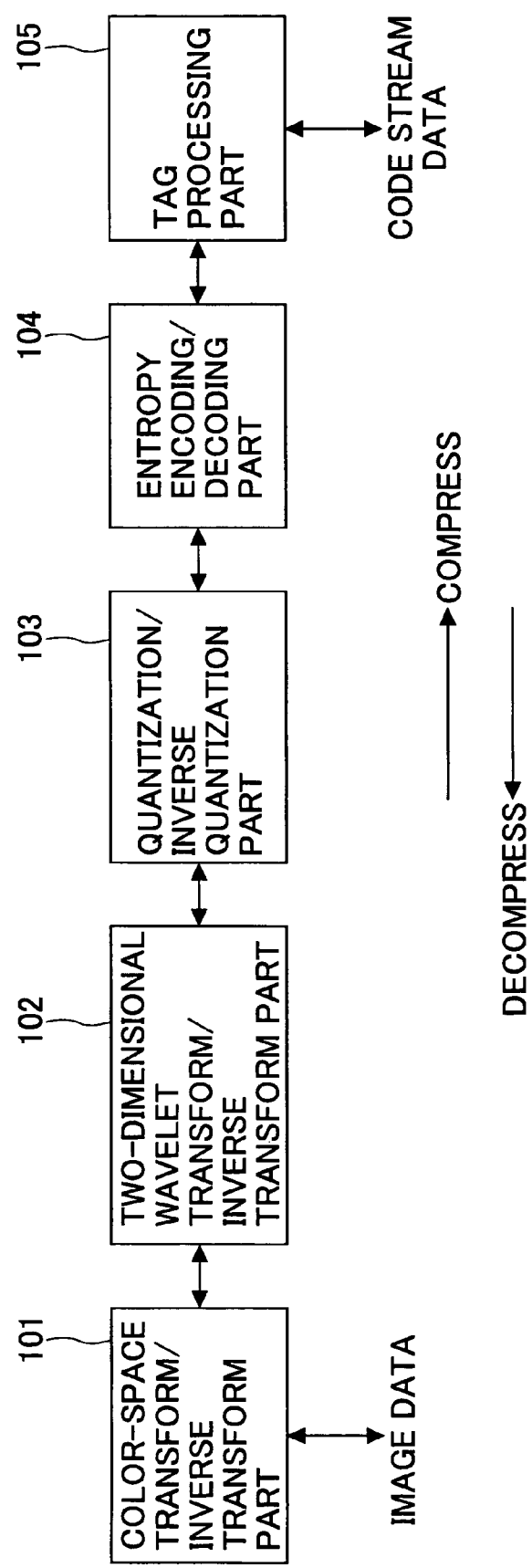
FIG. 1 is a block diagram showing the functions of a system executing a hierarchical coding algorithm serving as a base of a JPEG 2000 format which is a basic premise of one embodiment of the present invention.

One or more embodiments of the present invention include an image processing apparatus, a program, a recording medium, and a data decompression method that substantially obviates one or more of the problems caused by the limitations and disadvantages of the related art.

Features and advantages of embodiments of the present invention will be set forth in the description which follows, and in part will become apparent from the description and the accompanying drawings, or may be learned by practice of the invention according to the teachings provided in the description. Embodiments as well as other features and advantages of the present invention will be realized and attained by an image processing apparatus, a program, a recording medium, and an data decompression method particularly pointed out in the specification in such full, clear, concise, and exact terms as to enable a person having ordinary skill in the art to practice the invention.

To achieve these and other advantages and in accordance with a purpose of the invention, as embodied and broadly described herein, an embodiment of the invention includes an image processing apparatus, including: a decompressing unit to decompress image data having a first data compression format; an obtaining unit to obtain a second data compression format that is applicable for decompression by another image processing apparatus; a re-compressing unit to re-compress the decompressed image data with the second data compression format obtained by the obtaining unit; and a transmitting unit to transmit the re-compressed image data to the other image processing apparatus. The image processing apparatus according to one embodiment of the present invention further includes a memory unit to store the image data having the first data compression format. The image processing apparatus, according to one embodiment of the present invention, further includes a request receiving unit to receive a request from the other image processing apparatus requesting for the image data having the first data compression format. Further, according to one embodiment of the present invention, the first data compression format may be a JPEG 2000 format. Further, according to one embodiment of the present invention, the image processing apparatus and the other image processing apparatus may be connected via a network.

In an embodiment of the present invention, in comparison to a case where uncompressed images are transmitted from the image processing apparatus to the other image processing apparatus that is unable to perform decompression on, for example, JPEG 2000 compressed data, network traffic with respect to the other image processing apparatus can be reduced and JPEG 2000 compressed image files can be viewed by the other image processing apparatus.

In the image processing apparatus according to one embodiment of the present invention, the decompressing unit may selectively decompress a part of the image data having the first data compression format.

In an embodiment of the present invention, for example, in a case where decompression of the encoded data for a low resolution portion of an image is required or a case where ROI (Region Of Interest) is designated, the encoded data for the tiles of the designated ROI or the encoded data for a prescribed color component are decompressed in accordance with the decompression specification. In such a case, network traffic can be reduced.

In the image processing apparatus according to one embodiment of the present invention, the re-compression of the decompressed image data may be performed with a lossless compression scheme.

In an embodiment of the present invention, error-free high quality image data can be transmitted to the other image processing apparatus unable to decompress, for example, JPEG 2000 compressed data.

In the image processing apparatus according to one embodiment of the present invention, the lossless compression scheme may be an LZH scheme.

In an embodiment of the present invention, data compressed with the LZH scheme can be decompressed with a widely used (multi-purposed) decompression technique, and can be decompressed faster than by decompressing with the JPEG 2000 scheme.

In the image processing apparatus according to one embodiment of the present invention, the lossless compression scheme may be a JPEG/DPCM scheme.

In an embodiment of the present invention, data compressed with the JPEG/DPCM scheme can be decompressed with a widely used (multi-purposed) decompression technique, and can be compressed at high level using the redundancy of a low frequency area of an image.

In the image processing apparatus according to one embodiment of the present invention, the re-compression of the decompressed image data may be performed with a lossy compression scheme. In an embodiment of the present invention, image data, which is compressed in high level by effectively using the redundancy of a low frequency area of an image and the nature of a human eye that has difficulty in perceiving a high frequency area of an image, can be transmitted to the other image processing apparatus that is unable to decompress, for example, JPEG 2000 compressed data.

In the image processing apparatus according to one embodiment of the present invention, the lossy compression scheme may be a JPEG/DCT scheme.

In an embodiment of the present invention, data compressed with the JPEG/DCT scheme can be decompressed with a widely used (multi-purposed) decompression technique, and can be decompressed faster than by decompressing with the JPEG 2000 scheme.

In the image processing apparatus according to one embodiment of the present invention, the lossy compression scheme may be a GIF scheme.

In an embodiment of the present invention, in a case where a decompressed image file is compressed with GIF format, the progressive data stream of the GIF format allows a user to use an application, for example, to quickly obtain an outline of an image even in a small capacity network, and disconnect communication in the middle of receiving the image if the user finds the image to be unnecessary.

In the image processing apparatus according to one embodiment of the present invention, the re-compressing unit may switch between lossless compression and lossy compression according to a prescribed condition.

In an embodiment of the present invention, for example, a lossy compression process and a lossless compression process may be switched according to the traffic (load) of a network. This may provide a high speed and low cost communication.

Furthermore, one embodiment of the present invention comprises a data decompression method including a) decompressing image data having a first data compression format; b) obtaining a second data compression format that is applicable for decompression by another image processing apparatus; c) re-compressing the decompressed image data with the second data compression format obtained in b); and d) transmitting the re-compressed image data to the other image processing apparatus. The data decompression method, according to one embodiment of the present invention, further includes storing the image data having the first data compression format. The data decompression method, according to one embodiment of the present invention, further includes receiving a request from the other image processing apparatus requesting for the image data having the first data compression format. Further, in the data decompression method according to one embodiment of the present invention, the first data compression format may be a JPEG 2000 format. Further, in the data decompression method, according to one embodiment of the present invention, the image processing apparatus and the other image processing apparatus may be connected via a network.

In an embodiment of the present invention, in comparison to a case where uncompressed images are transmitted from the image processing apparatus to the other image processing apparatus that is unable to perform decompression on, for example, JPEG 2000 compressed data, network traffic with respect to the other image processing apparatus can be reduced and JPEG 2000 compressed image files can be viewed with the other image processing apparatus.

Furthermore, one embodiment of the present invention includes an article of manufacture having recordable media storing a program to be installed or executed by a computer having an image processing apparatus, which is in communication with another image processing apparatus, where the program when executed performs a decompressing function to decompress image data having a first data compression format; an obtaining function to obtain a second data compression format that is applicable for decompression by the other image processing apparatus; a re-compressing function to re-compress the decompressed image data with the second data compression format obtained by the obtaining function; and a transmitting function to transmit the re-compressed image data to the other image processing apparatus. Further, in one embodiment of the present invention, the program when executed performs a memory function to store the image data having the first data compression format. Further, in one embodiment of the present invention, the program when executed performs a request receiving function to receive a request from the other image processing apparatus requesting for the image data having the first data compression format. Further, in one embodiment of the present invention, the first data compression format may be a JPEG 2000 format. Further, in one embodiment of the present invention, the image processing apparatus and the other image processing apparatus may be connected via a network.

In an embodiment of the present invention, in comparison to a case where uncompressed images are transmitted from the image processing apparatus to the other image processing apparatus that is unable to perform decompression on, for example, JPEG 2000 compressed data, network traffic with respect to the other image processing apparatus can be reduced and JPEG 2000 compressed image files can be viewed with the other image processing apparatus.

According to one embodiment of the present invention, the decompressing function may selectively decompress a part of the image data having the first data compression format.

In an embodiment of the present invention, for example, in a case where decompression of the encoded data for a low resolution portion of an image is required or a case where ROI (Region Of Interest) is designated, the encoded data for the tiles of the designated ROI or the encoded data for a prescribed color component are decompressed in accordance to the decompression specification. In such a case, network traffic can be reduced.

According to one embodiment of the article of manufacture, the re-compression of the decompressed image data may be performed with a lossless compression scheme.

In an embodiment of the article of manufacture, error-free high quality image data can be transmitted to the other image processing apparatus unable to decompress, for example, JPEG 2000 compressed data.

According to one embodiment of the article of manufacture, the lossless compression scheme may be an LZH scheme.

In an embodiment of the article of manufacture, data compressed with the LZH scheme can be decompressed with a widely used (multi-purposed) decompression technique, and can be decompressed faster than by decompressing with the JPEG 2000 scheme.

According to one embodiment of the article of manufacture, the lossless compression scheme may be a JPEG/DPCM scheme.

In an embodiment of the article of manufacture, data compressed with the JPEG/DPCM scheme can be decompressed with a widely used (multi-purposed) decompression technique, and can be compressed at high level using the redundancy of a low frequency area of an image.

According to one embodiment of the article of manufacture, the re-compression of the decompressed image data may be performed with a lossy compression scheme.

In an embodiment of the article of manufacture, image data, which is compressed in high level by effectively using the redundancy of a low frequency area of an image and the nature of a human eye that has difficulty in perceiving a high frequency area of an image, can be transmitted to the other image processing apparatus that is unable to decompress, for example, JPEG 2000 compressed data.

According to one embodiment of the article of manufacture, the lossy compression scheme may be a JPEG/DCT scheme.

In an embodiment of the article of manufacture, data compressed with the JPEG/DCT scheme can be decompressed with a widely used (multi-purposed) decompression technique, and can be decompressed faster than by decompressing with the JPEG 2000 scheme.

According to one embodiment of the article of manufacture, the lossy compression scheme may be a GIF scheme.

In an embodiment of the article of manufacture, in a case where a decompressed image file is compressed with GIF format, the progressive data stream of the GIF format allows a user to use an application, for example, to quickly obtain an outline of an image even in a small capacity network, and disconnect communication in the middle of receiving the image if the user finds the image to be unnecessary.

According to one embodiment of the article of manufacture, the re-compressing function may switch between lossless compression and lossy compression according to a prescribed condition.

In an embodiment of the article of manufacture, for example, a lossy compression process and a lossless compression process may be switched according to the traffic (load) of a network, to thereby provide a high speed and low cost communication.

According to one embodiment of the article of manufacture, the program may be stored in a recording medium.

In an embodiment of the article of manufacture, storing the program in a recording medium, and installing the program in a computer or interpreting the program with a computer allows the foregoing functions of an embodiment of the present invention to be accomplished.

Other embodiments and further features of the present invention will be apparent from the following detailed description when read in conjunction with the accompanying drawings.

In the following, embodiments of the present invention will be described with reference to the accompanying drawings.

First, an overall description of a hierarchical coding algorithm and a JPEG 2000 algorithm, which are basic premises of one embodiment of the present invention, is given below.

FIG. 1 is a block diagram showing blocks representing functions of a system executing a hierarchical coding algorithm, which serves as a base for a JPEG 2000 scheme. The system includes functional blocks of: a color-space transform/inverse transform unit 101, a two-dimensional wavelet transform/inverse transform unit 102, a quantization/inverse quantization unit 103, an entropy encoding/decoding unit 104, and a tag processing unit 105.

In comparison with the conventional JPEG algorithm, one of the most significant differences is the method of transformation. While a DCT (Discrete Cosine Transform) method is applied to the conventional JPEG, a DWT (Discrete Wavelet Transform) method is applied to the hierarchical encoding algorithm in the two-dimensional wavelet transform/inverse transform unit 102. The DWT method, in comparison with the DCT method, is advantageous in that high quality images can be provided in areas compressed at high levels. This is one major reason in employing the DWT method for the JPEG 2000 algorithm that serves as a successor of the JPEG algorithm.

As another significant difference, a functional block referred to as the "tag processing unit 105" is added to the hierarchical encoding algorithm for executing code formation at the final stage of the system. In the tag processing unit 105, compressed data is generated in a form of code stream data during an image compression operation, and code stream data required to be decompressed is interpreted during a decompression operation. By using the code stream data, the JPEG 2000 is able to provide a variety of useful functions. For example, a compression/decompression operation can be terminated, on a block basis, at an arbitrary level (decomposition level) according to a level with respect to octave separation of DWT (Refer to FIG. 3 described below). This allows a low resolution part (size-reduced image) to be extracted from a file. Furthermore, a part of an image (tiling image) can also be extracted.

In many cases, the color-space transform/inverse transform unit 101 is connected to an input/output unit for an original image. The color-space transform/inverse transform unit 101 performs color-space transformation/inverse transformation, for example, transformation/inverse transformation from an RGB color expression system (comprising primary color components of Red (R), Green (G), and Blue (B)) or a YMC color expression system (comprising complementary color components of Yellow (Y), Magenta (M), and Cyan (C)) to a YUV or YCbCr color expression system.

Next, a JPEG 2000 algorithm is described in detail below.

Figure 2:
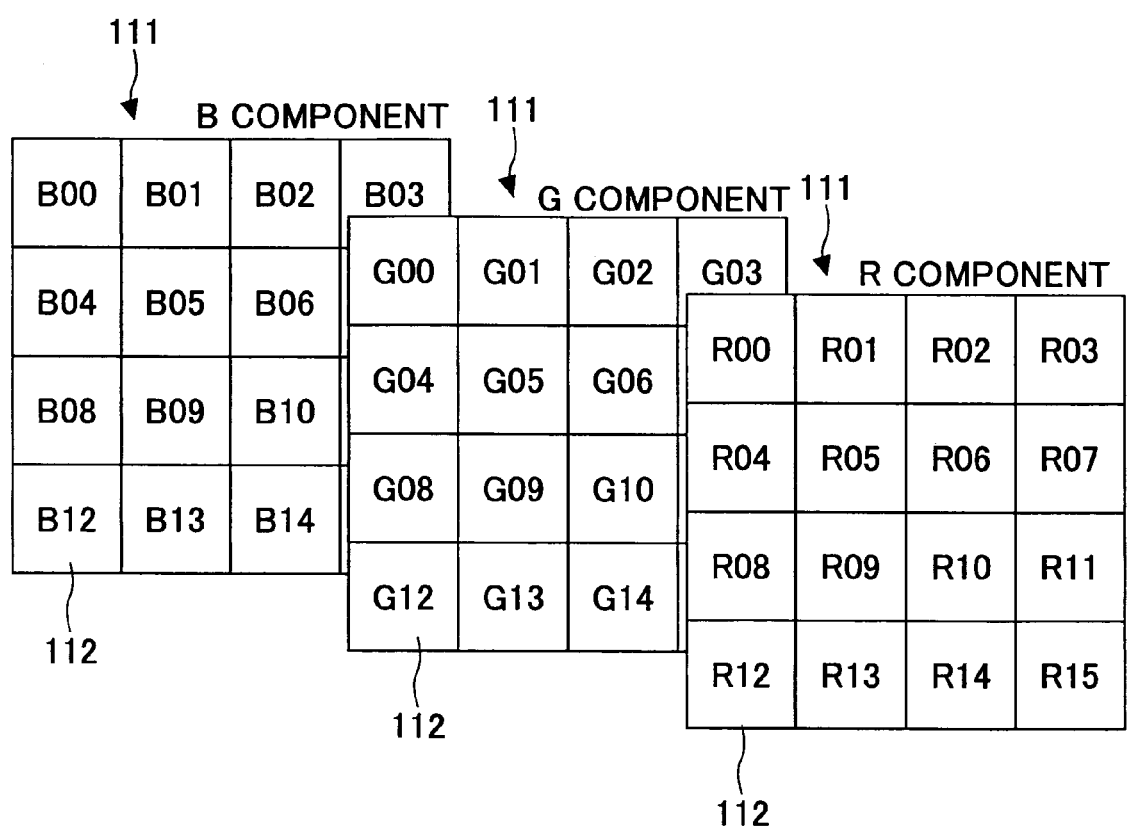
FIG. 2 is an explanatory view showing respective components of an original image divided into rectangular areas.
Figure 3A:
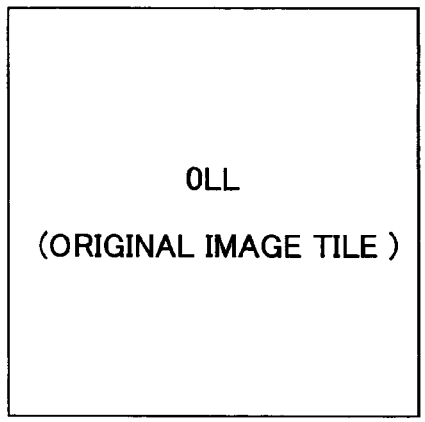
FIGS. 3A to 3D are explanatory views showing sub-bands for each decomposition level in a case where the number of decomposition levels is 3.
Figure 3B:
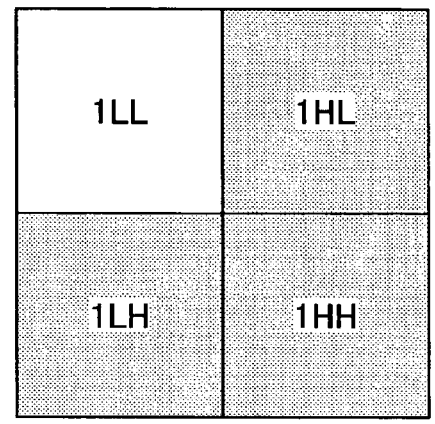
Figure 3C:
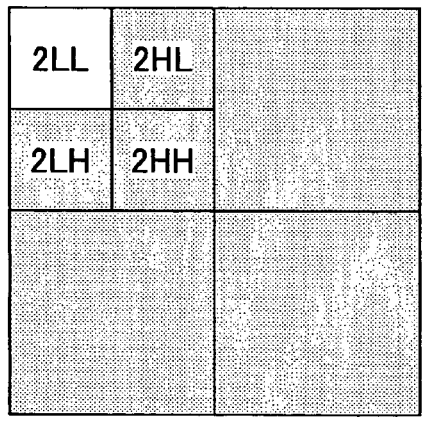
Figure 3D:
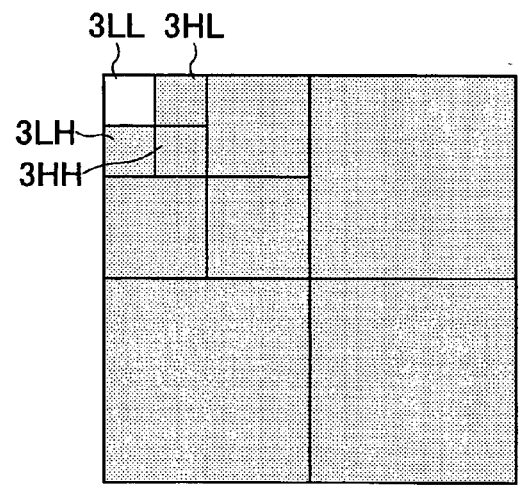

In terms of color images, each of the components (in this embodiment, the components of an RGB color expression system) of an original image 111 is divided, generally, into rectangular areas in a manner shown in FIG. 2. Although the rectangular areas are typically referred to as "blocks" or "tiles," since the rectangular areas are normally referred to as "tiles" under the JPEG 2000 standard, the rectangular areas will hereinafter be referred to as "tiles" (In the example shown in FIG. 2, each component III is divided vertically S and horizontally into 4×4 tiles 112 being a total of 16 tiles). Each of the tiles 112 (in the example shown in FIG. 2, R00, R01, ..., R1S/G00, G01, ..., G1S/B00, B01, ..., B1S) serves as a basic unit to which an image data compression/decompression operation is performed. Therefore, the image data compression/decompression operation is performed independently for each component 111 and each tile 112.

In an image data encoding operation, image data of each tile 112 of each component 111 is input to the color-space conversion/inverse conversion unit 101 (see FIG. 1), at which color-space transformation is performed. Subsequent to the color-space transformation, the image data is subjected to two-dimensional wavelet transformation in the two-dimensional wavelet transform/inverse transform unit 101, and is spatially divided into frequency bands.

FIG. 3 shows sub-bands in each decomposition level in a case where the number of decomposition levels is 3. That is, an original image tile (0 LL) on decomposition level 0 obtained by dividing the original image into tiles is subjected to two-dimensional wavelet transformation, and is divided into sub-bands 1LL, 1HL, 1LH, and 1HH on decomposition level 1. Then, the low frequency sub-band 1LL on decomposition level 1 is subjected to two-dimensional wavelet transformation, and is further divided into sub-bands 2LL, 2HL, 2LH, and 2HH on decomposition level 2. Similarly, the low frequency sub-band 2LL is subjected to two-dimensional wavelet transformation, and is further divided into sub-bands 3LL, 3HL, 3LH, and 3HH on decomposition level 3. The sub-bands that are to be encoded on each decomposition level are indicated with hatching in FIG. 3. For example, in a case where the number of decomposition levels is 3, the sub-bands indicated with the hatchings (3HL, 3LH, 13HH, 2HL, 2LH, 2HH, 1HL, 1LH, 1HH) will be subjected to encoding, while the sub-band 3LL will not be subjected to encoding.

Next, bits to be encoded are determined according to a predetermined encoding order, and then, a context is created in the quantization/inverse quantization unit 103 from bits in the periphery of the targeted bit.

Figure 4:
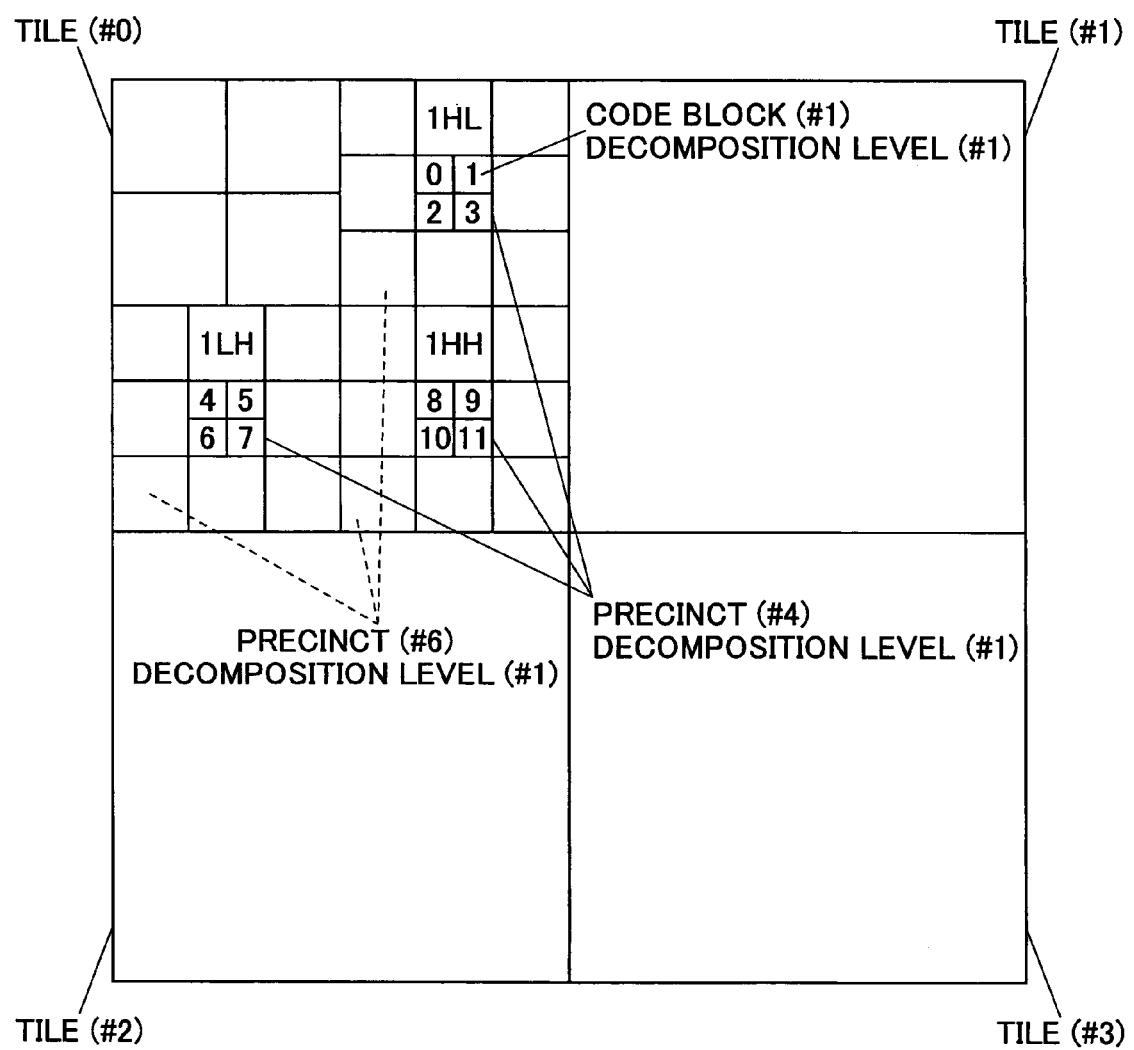
FIG. 4 is an explanatory view showing precincts.

Wavelet coefficients having undergone the quantization process are divided into non-overlapped rectangles referred to as "precincts" for each sub-band. This scheme is introduced in order to efficiently use memory during an implementation process. As shown in FIG. 4, each precinct is formed of three spatially consistent rectangular areas. Further, each precinct is divided into non-overlapped rectangular "code blocks." Each code block is used as a basic unit when entropy coding is performed.

The quantizing and encoding of the coefficient values may be performed immediately after the coefficient values have undergone wavelet transformation; however, in order to improve encoding efficiency, each of the coefficient values in the JPEG 2000 scheme may be decomposed into units of "bit planes" and the sequence of the bit planes may be determined according to each pixel or code block.

Figure 5:
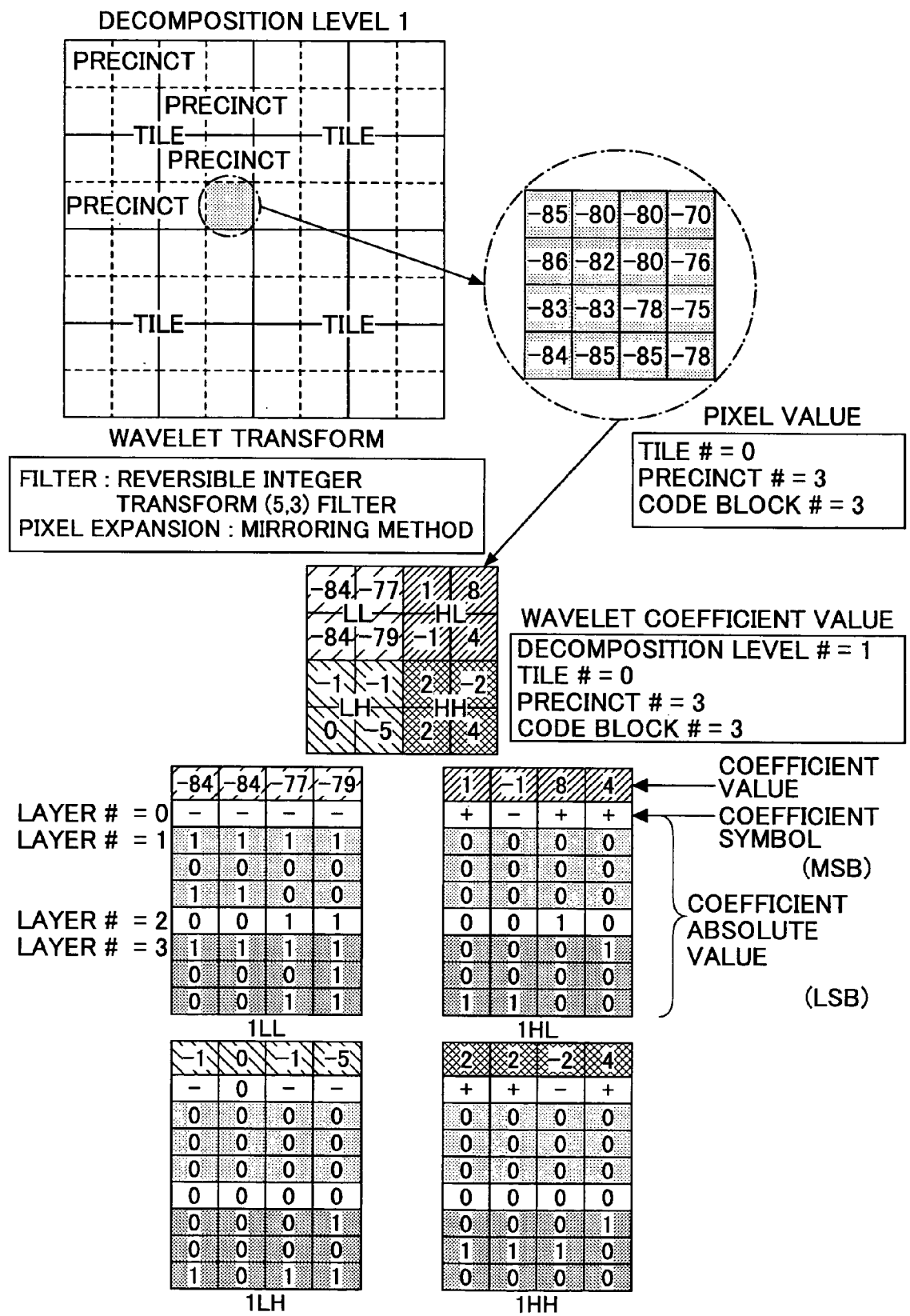
FIG. 5 is an explanatory view showing an example of a procedure of assigning the sequence of bit plane.

FIG. 5 is an explanatory view showing an example of a procedure of assigning the sequence of bit planes. The example in FIG. 5 shows an original image (32×32 pixels) divided into four tiles of 16×16 pixels, in which the sizes of the precincts and the code blocks on decomposition level 1 are 8×8 pixels, and 4×4 pixels, respectively.

The precincts and the code blocks are assigned with numbers in raster order. In this example, the precincts are assigned with numbers 0 through 3, and the code blocks are assigned with numbers 0 through 3. In expanding pixels beyond the tile boundaries, a mirroring method is employed, and wavelet transformation is performed with a reversible Le Gall 5-tap/3-tap filter, to thereby obtain the wavelet coefficient value on decomposition level 1.

Furthermore, FIG. 5 also shows an example of a representative layer structure with respect to tile O/precinct 3/code block 3. In the example, the code block having undergone wavelet transformation is divided into sub-bands (1LL, 1HL, 1LH, 1HH), and each of the sub-bands is assigned with wavelet coefficient values.

The layer structure is relatively easy to understand when the wavelet coefficient values are viewed from the side (bit-plane direction). In this example, layer # 0, 1, 2, and 3 are formed of bit-planes of 1, 3, 1, and 3, respectively. A layer is more likely to be quantized when a bit-plane included therein is more close to the LSB (Least Significant Bit). On the other hand, a layer is less likely to be subjected to quantizing when a bit-plane included therein is more close to the MSB (Most Significant Bit), and therefore will remain free from quantizing until further on. The method of removing a layer that is close to LSB is referred to as "truncation," in which the method enables quantizing rates to be controlled accurately.

In the entropy encoding/decoding unit 104 shown in FIG. 1, encoding is performed on the tiles 112 of each component 111 based on a probability estimation technique from the contexts and targeted bits. Accordingly, the encoding process is performed on all of the components 111 of the original image on a tile 112 basis. Finally, in the tag processing unit 105, all of the encoded data from the entropy encoding/decoding unit 104 is formed into a single code stream data, and a tag is attached to the code stream data.

Figure 6:
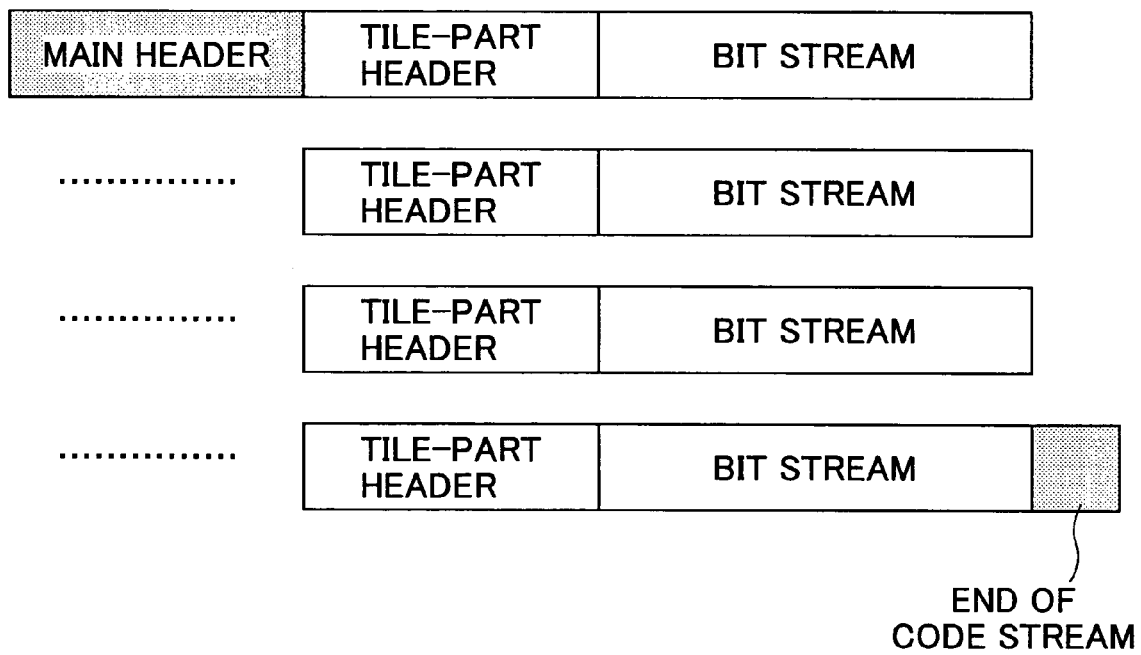
FIG. 6 is an explanatory view showing a schematic structure of code stream data for a single frame.

A structure of the code stream data for a single frame is schematically shown in FIG. 6. Tags (tag information) called headers (including a main header and tile part headers) are attached to the head of the code stream, and the head of each tile-part. Subsequent to the attachment of the headers, the encoded data (bit stream) for each tile is attached. It is to be noted that encoding parameters and quantizing parameters are written in the main header. Then again, a tag (end of code stream) is attached at the end of the code stream data.

The operation of decoding encoded data is, on the other hand, conducted inversely with respect to the operation of encoding image data, in which image data is produced from a code stream of each tile 112 of each component 111. In this case, the tag processing unit 105 interprets the tag information attached to the code stream input from the exterior, then the code stream is decomposed into code streams for each tile 112 of each component 111, and then decode processing (decompression) is performed for every code stream of each tile 112 of each component 111. Along with determining the positions of bits that are targeted for decoding in accordance with the sequence based on the tag information in the code stream, the context is produced from the arrangement of peripheral bits (already decoded) in the quantization/inverse quantization unit 103. In the entropy encoding/decoding unit 104, decoding is performed by probability estimation according to the code stream and the contexts, to thereby reproduce the targeted bits. The targeted bits are disposed at the relevant pixel position. Accordingly, since the decoded data is spatially divided into respective frequency bands (sub-bands), each tile of each component of the image data is restored by performing a two-dimensional wavelet inverse transformation in the two-dimensional wavelet transverse/inverse transform unit 102. The obtained restored data is transformed into image data of the original color system by the color space transform/inverse transform unit 101.

Next, an embodiment according to the present invention is described below. Although an example of JPEG 2000, which serves as a representative example of compressing/decompressing images, is described below, it is to be noted that the present invention is not to be limited to such description.

The server computer and the client computer of one embodiment of the present invention perform image processing in accordance with a program that is installed therein or interpreted thereby. In the present embodiment, a recording medium having the program recorded thereto will also be described below.

Figure 7:
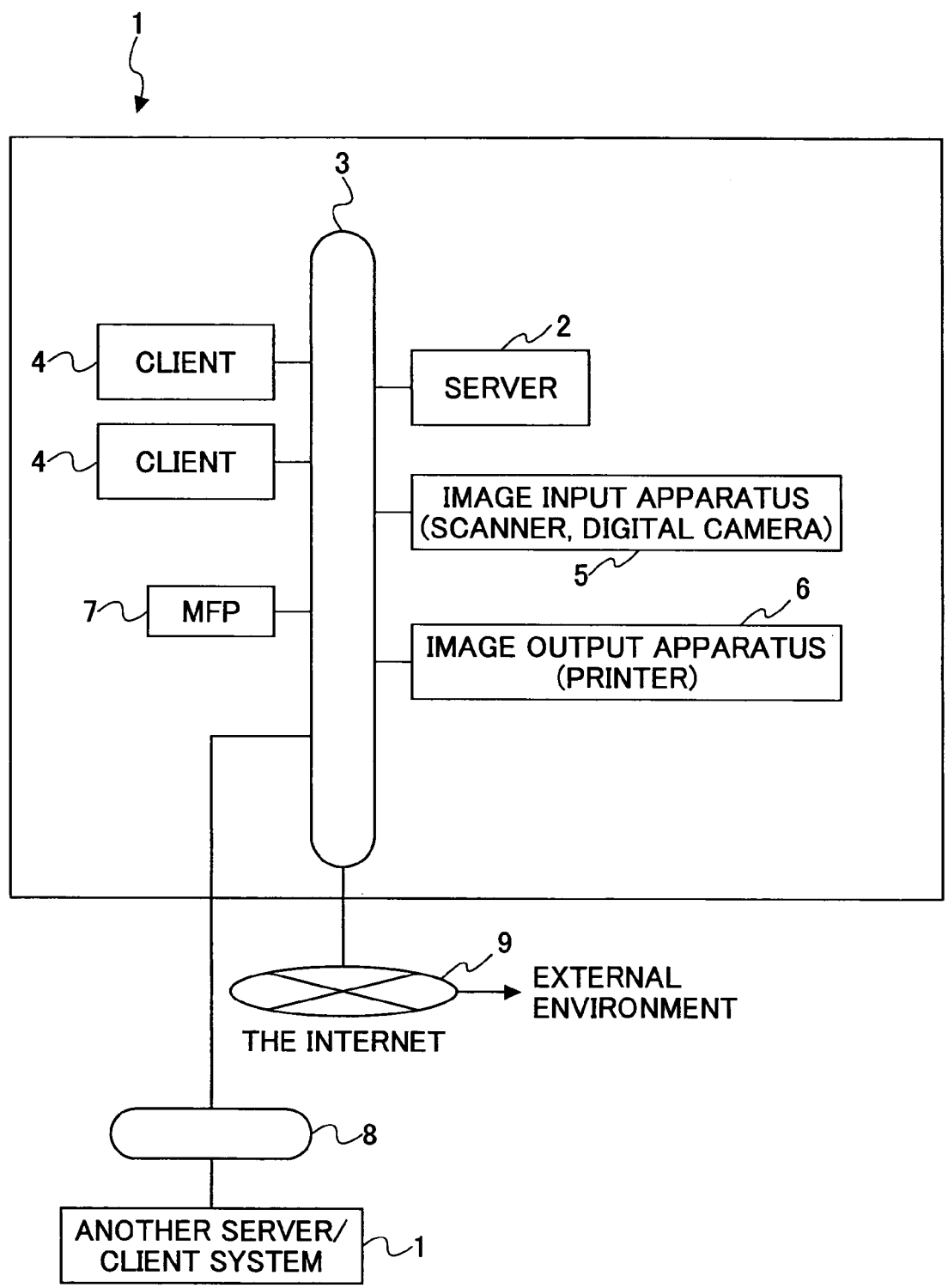
FIG. 7 is a schematic view showing an example of a system structure according to one embodiment of the present invention.

FIG. 7 is a schematic view showing an example of an image data processing system structure in one embodiment of the present invention.

The image data processing system according to an embodiment of the present invention assumes a server/client system 1, in which a server computer 2 (image processing apparatus) is connected to plural client computers 4 (other image processing apparatuses) via a network 3 such as LAN (Local Area Network). The server/client system 1 is provided with an environment being able to share an image input device 5 (e.g. scanner, digital camera) and an image output device 6 (printer) via the network 3. The network 3 may be provided with a multi-function peripheral (MFP) 7, in which the MFP 7 may function as the image input device 5 and/or the image output device 6.

The server/client system 1 is established to be able to perform, for example, data communication with another server/client system 1 via an intranet 8, and also perform data communication with the external environment via the Internet 9.

The server computer 2 provides an image management function for storing various images as image data.

Figure 8:
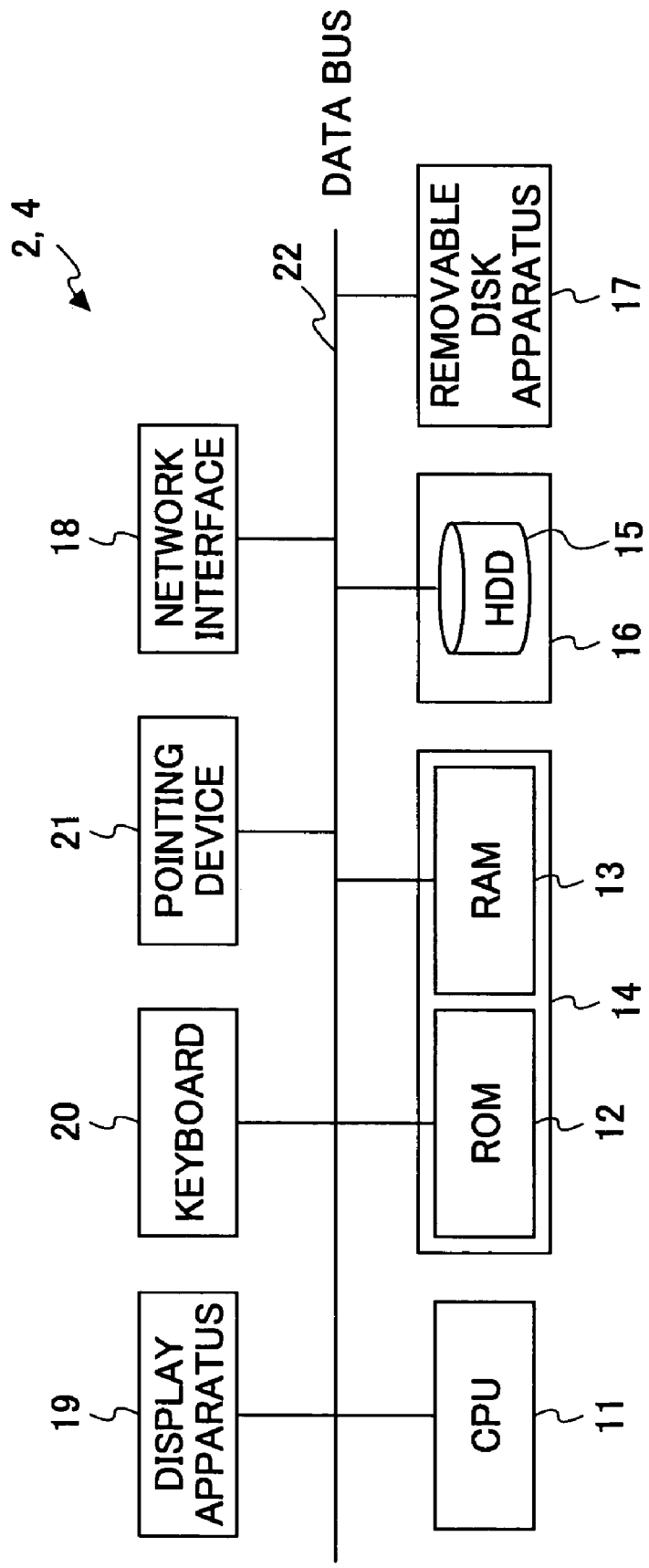
FIG. 8 is a schematic view of a module of an image processing apparatus.

FIG. 8 shows a module structure of the server computer 2 and the client computer 4, each of which serves as an image processing apparatus, according to an embodiment of the present invention.

The server computer 2 and the client computer 4 both include, for example, a CPU (Central Processing Unit) for processing information; a first memory unit 14 such as a ROM (Read Only Memory) 12 for storing information and/or a RAM (Random Access Memory) 13; a second memory unit 16 such as a HDD (Hard Disk Drive) 15 serving as a memory unit for storing data files (image data and document data) of various formats and compressed data (described in detail below); a removable disk unit 17 such as a CD-ROM disk drive for storing information, for distributing information outside, and/or for importing information from outside; a network interface 18 for transmitting information by external computers via the network 3; a display unit 19 such as a CRT (Cathode Ray Tube) or an LCD (Liquid Crystal Display) for displaying processing status and/or results to the operator; a keyboard 20 for allowing the operator to input commands and/or information to the CPU 11; and a pointing device 21 such as a mouse. A data bus (bus controller) 22 serves to mediate the data transmitted between each of the above-given components.

Figure 9:
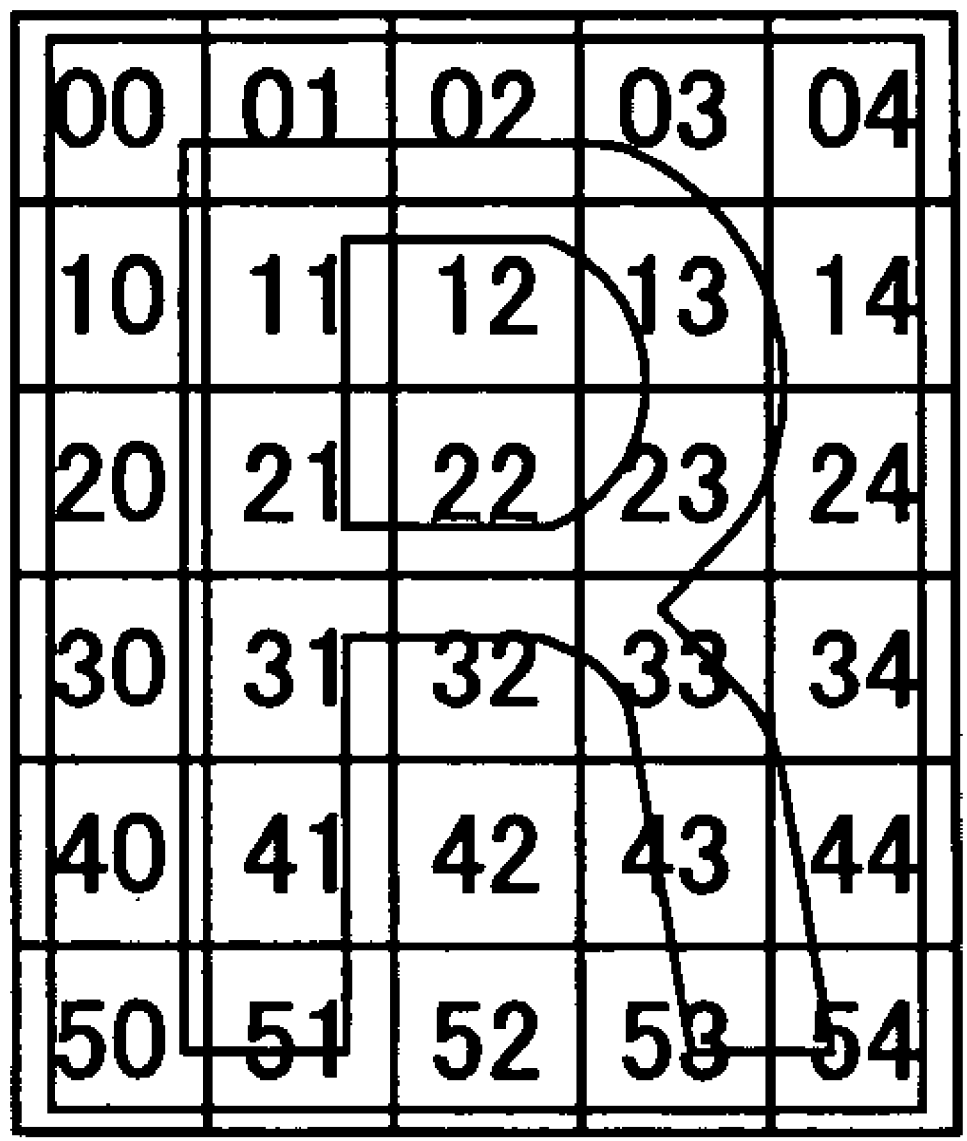
FIG. 9 is an explanatory view showing an example of an image being divided two-dimensionally.

In one embodiment of the present invention, the compressed image data is stored in the HDD 15 of the server computer 2. It is to be noted that the image data stored in the HDD 15 of the server computer 2 is compressed data generated in compliance with the JPEG 2000 algorithm. More specifically, the compressed data is formed as a one-dimensional alignment as shown in FIG. 10 by compressing/encoding images divided into rectangular regions (tiles) as shown in FIG. 9. In FIG. 10, SOC is a marker segment indicating the start of a code stream. Furthermore, MH is a main header that stores a value that is common to the entire code stream. For example, the amount of vertical tiles, the amount of horizontal tiles, the amount of horizontal images, and the amount of vertical images are recorded to the main header as the value common to the entire code stream. The data that follows MH is encoded data for each tile. In FIG. 10, compressed data for each tile is arranged in a main scanning direction/sub-scanning direction in accordance with tile numbers as shown in FIG. 9. The EOC marker at the end of the code stream is a marker segment indicating the end of the code stream.

Figure 11:
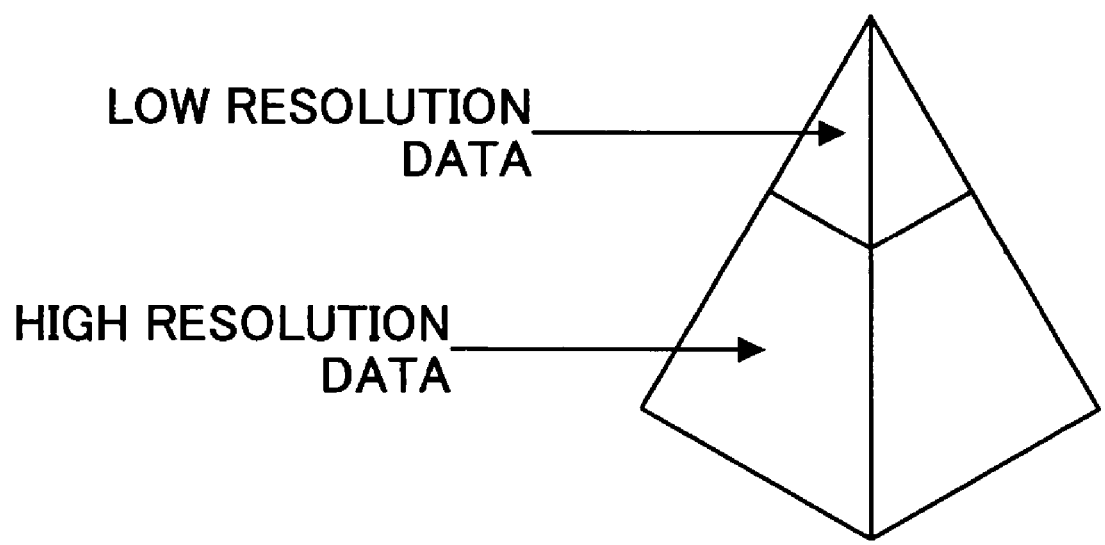
FIG. 11 is an explanatory view showing a resolution model of compressed code generated in accordance with the JPEG 2000 algorithm.

FIG. 11 is an explanatory view showing a resolution model for compressed data generated in accordance with the JPEG 2000 algorithm. The compressed data generated in accordance with the JPEG 2000 algorithm can be separated into low resolution data and high resolution data, inside an image file (see FIG. 11). It is to be noted that, although merely two kinds of resolutions are indicated in FIG. 11, it is also possible to provide a plurality of low resolution parts on a given level (decomposition level) according to octave separation of DWT (e.g. ½, ¼, ⅛, ⅟₁₆, . . . , $½^n$) in a case where the entire data is 1.

In the server computer 2 and the client computer 4, when power is turned on by the operator, the CPU 11 activates a program referred to as a loader in the ROM 12, and the RAM 13 then reads an operating system program, which manages hardware and software in the computer, from the HDD 15, to thereby activate the operating system. The operating system serves to, for example, activate programs, read and/or store information according to the controls of the operator. As representative examples of the operating system, Windows (Registered Trademark) and/or UNIX (Registered Trademark) are well known. The program running in the operating system is referred to as an application program.

Here, the server computer 2 and the client computer 4 store an image processing program in the HDD 15 as the application program. In this sense, the HDD 15 functions as a recording medium having the image processing program stored therein.

In general, the image processing program to be installed in the second memory unit 16 (e.g., HDD 15) of the server computer 2 and the client computer 4 is first recorded to an optic information recording medium (e.g., CD-ROM, DVD-ROM) or a magnetic medium (e.g. flexible disk), and is then installed to the second memory unit 16 (e.g., HDD 15). Therefore, a recording medium (e.g., an optic information recording medium such as a CD-ROM, a magnetic medium such as a flexible disk), which can be transported, may also be a recording medium having the image processing program stored therein. Further, the image processing program may, for example, be extracted from the external via the network interface 18, and installed in the second memory unit 16 (e.g., HDD 15).

In the server computer 2 and the client computer 4, the CPU 11, in accordance with the image processing program, performs various computing processes and controls each of the parts included in the image processing apparatus. Among the various computing processes performed by the CPU 11 of the server computer 2 and the CPU 11 of the client computer 4, the characteristic processes of the present embodiment are described below.

It is to be noted that process speed is required to be accelerated in a case where real time performance is an important factor. In order to do so, a logic circuit (not shown) is required so as to perform various processes using the logic circuit.

Figure 12:
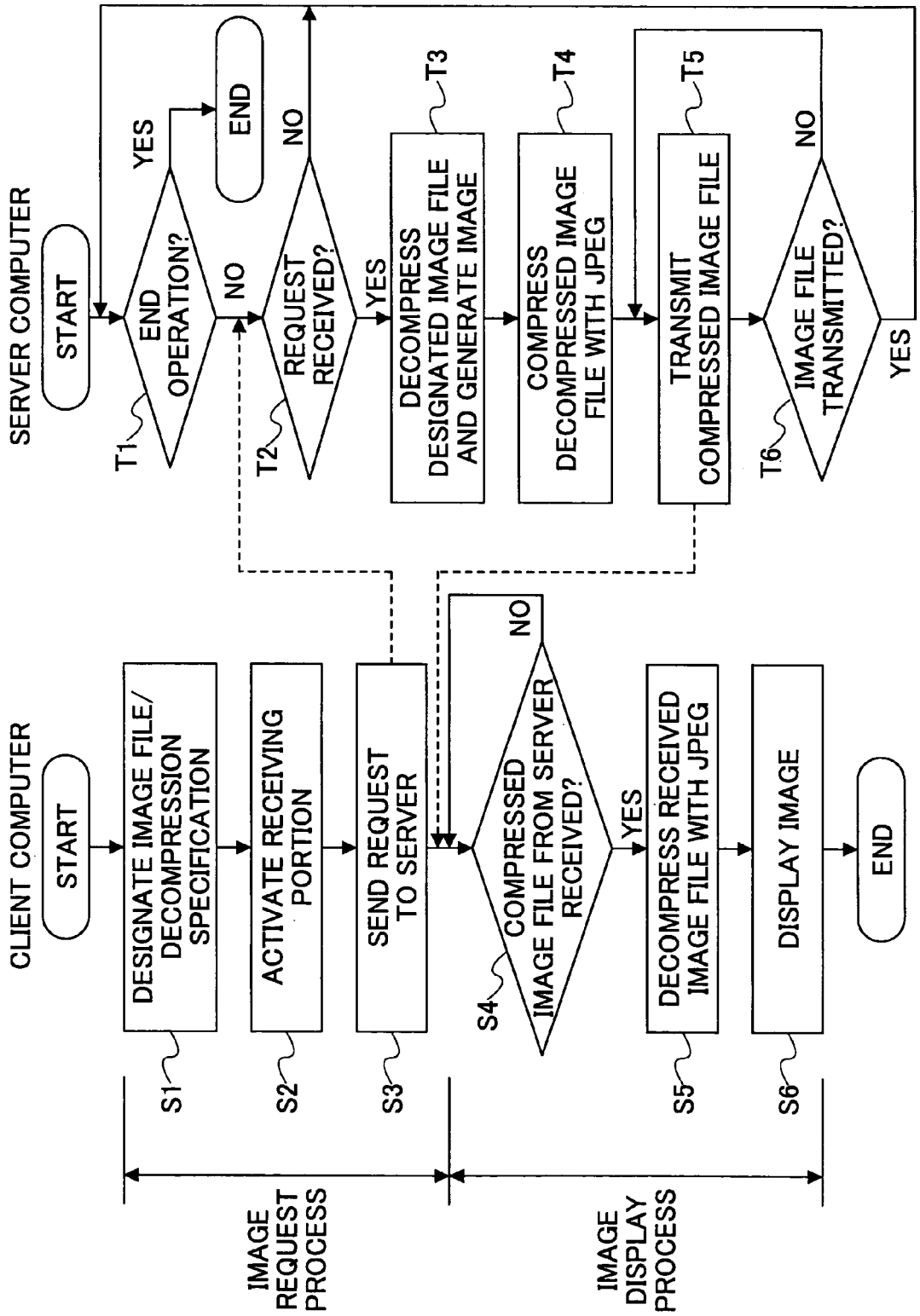
FIG. 12 is a flowchart showing a flow of an image request/display process.

An image request/display process and communication between the CPU 11 of the server computer 2 and the CPU 11 of the client computer 4 is described below. FIG. 12 is a flowchart showing the flow of the image request/display process. In the image request/display process shown in FIG. 12, first, an operator (a user operating the client computer 4), with use of the keyboard 20 or the pointing device 21, designates a JPEG 2000 image file stored in the HDD 15 of the server computer 2 and a decompression specification of the image file. (Step S1). The decompression specification includes specifications regarding, for example, the vertical and horizontal size of a decompression area, the number of wavelet levels, and the number of color components. Accordingly, for example, in a case where decompression of the encoded data for a low resolution portion of an image is required or a case where ROI (Region Of Interest) is designated, the encoded data for the tiles of the designated ROI or the encoded data for a prescribed color component are decompressed in accordance with the decompression specification. Thereby, network traffic can be reduced.

Next, a receiving portion in the client computer 4 is activated (Step S2). That is, in this stage, a receiving program that performs a receive process (described below in Step S4) is activated. The receiving program is in a standby state until receiving a response from the server computer 2.

In Step S3, the designated JPEG 2000 image file and the decompression specification is transmitted to the server computer 2 in the form of a request signal.

By performing the aforementioned Steps S1 through S3, the image request process is accomplished.

It is to be noted that the request signal from the client computer 4 includes a compression format that can be decompressed by an application of the client computer 4. Here, in this example, a JPEG/DCT format is employed as the compression format that the client computer 4 is able to decompress by using an application thereof. In other words, in this particular example, the client computer 4 is unable, or it is otherwise undesirable to have the client computer 4, to decompress data that is encoded according to the JPEG 2000 format.

The server computer 2 is in a stand-by state for detecting an operation ending signal (YES in Step T1), or for receiving the request signal from the client computer 4 (YES in Step T2).

Described below is an operation of the server computer 2 upon receiving a request of an image file from the client computer 4 that is unable, or it is otherwise undesirable to have the client computer 4, to decompress encoded data according to the JPEG 2000 format.

The CPU 11 of the server computer 2 includes an image request receiving unit and a decompression unit. The image request receiving unit of the CPU 11 of the server computer 2 receives the request signal including the JPEG 2000 image file and decompression specification from the client computer 4 (YES in Step T2). Then, the decompression unit of the CPU 11 of the server computer 2 performs decompression on the designated image file in accordance with the designated decompression specification, to thereby generate a decompressed image of the image file (Step T3). Here, the description of the decompression process according to the JPEG 2000 algorithm is omitted since it is described above in the description of the color-space transform/inverse transform unit 101, the two-dimensional wavelet transform/inverse transform unit 102, the quantization/inverse quantization unit 103, the entropy encoding/decoding unit 104, and the tag processing unit 105 shown in FIG. 1.

The CPU 11 of the server computer 2 further includes an obtaining unit (compression format obtaining unit). The obtaining unit of the CPU 11 of the server computer 2 is able to obtain a compression format that can be decompressed by the client computer 4 owing that the compression format (in this example, JPEG/DCT format) is included in the request signal transmitted from the client computer 4.

It is to be noted that the compression format can be obtained by using other various procedures, and is not to be limited to the aforementioned procedure. For example, data of client computers 4 and decompressible compression formats can be stored in a data table, and a compression format corresponding to the client computer 4 that has requested an image file can be obtained by referring to the data table.

The CPU 11 of the server computer 2 also includes a re-compression unit. According to an exemplary embodiment of the present invention, here the re-compression unit of the CPU 11 of the server computer 2 compresses the generated decompressed image into JPEG/DCT format, which is the compression format on which the client computer 4 is able to perform decompression (Step T4). It is to be noted that the description of the compression process of the JPEG/DCT format will be omitted since the compression process is a known technique.

The CPU 11 of the server computer 2 further includes a compressed data transmitting unit. The compressed data transmitting unit of the CPU 11 of the server computer 2 transmits the JPEG image file compressed in Step T4 to the client computer 4 that transmitted the request signal (Step T5).

In Step T6, the CPU 11 of the server computer 4 checks whether the JPEG image file is appropriately transmitted to the client computer 4. Although there are various obstacles that may prevent the JPEG image file from being appropriately transmitted to the client computer 4 (e.g., a case where the client computer 4 is in a busy state, a case where the network is disconnected), and also various measures to counter the obstacles, further detail description thereof is omitted.

In a case where the JPEG image file is not appropriately transmitted to the client computer 4 (NO in Step T6), the JPEG image file generated in Step T4 is once again transmitted to the client computer 4 by returning to Step T5.

In a case where the JPEG image file is appropriately transmitted to the client computer 4 (YES in Step T6), the server computer 1 stands by for the next request signal by returning to Step T1.

When the server computer 1 detects the operation ending signal (YES in Step T1), the server computer 1 ends operating. The CPU 11 of the server computer 2 may be predetermined to end the decompression/re-compression operation after one cycle of the decompression/re-compression operation is performed.

After the client computer 4 receives the JPEG image file from the server computer 2 (YES in Step S4), the CPU 11 of the client computer 4 performs a decompression process (decoding process) on the JPEG image file (Step S5), and displays the decompressed image on the display apparatus 19 (Step S6). It is to be noted that the description of the decompression process of the JPEG format will be omitted since the decompression process is a known technique.

By performing the aforementioned Steps S4 through S6, the image display process is accomplished.

Accordingly, upon receiving a request for transmittal of an image file from the client computer 4, the server computer 2, having JPEG 2000 compressed image files stored therein, decompresses the JPEG 2000 compressed image file in response to the request from the client computer 4, compresses (re-compresses) the decompressed image file according to the compression format that the client computer 4 is able to decompress, and transmits the re-compressed image file to the client computer 4. Therefore, in comparison to a case where uncompressed images are transmitted from a server computer to a client computer that is unable to perform decompression on JPEG 2000 compressed data, network traffic between the client computer 4 and the server computer 2 can be reduced and JPEG compressed image files can be viewed by the client computer 4.

It is to be noted that although the decompressed image file is compressed with JPEG/DCT format in Step T4 of the present embodiment, other formats may also be used. For example, as for lossy compression processes besides using the JPEG/DCT format, GIF format may be used for compressing the decompressed image file. In a case where the decompressed image file is compressed with GIF format, the progressive data stream of the GIF format allows a user to use an application, for example, to quickly obtain an outline of an image even in a small capacity network, and disconnect communication in the middle of receiving the image if the user finds the image to be unnecessary.

Compression of the decompressed image file is not limited to lossy compression processes, but lossless compression processes may also be employed. The lossless compression process may include, for example, an LZH scheme, or a JPEG/DPCM scheme. Data compressed with the LZH scheme can be decompressed with a widely used (multi-purposed) decompression technique, and can be decompressed faster than by decompressing with the JPEG 2000 scheme. Data compressed with the JPEG/DPCM scheme can also be decompressed with a widely used (multi-purposed) decompression technique, and can be compressed at high level using the redundancy of a low frequency area of an image.

Furthermore, switch can be made between a lossy compression process and a lossless compression process according to a prescribed condition. For example, the lossy compression process and the lossless compression process may be switched according to the traffic (load) of the network 3 connecting the server computer 2 and the client computer 4, to thereby constantly provide a high speed and low cost communication.

Further, the present invention is not limited to these embodiments, but various variations and modifications may be made without departing from the scope of the present invention.

The present application is based on Japanese Priority Application No.2003-005517 filed on Jan. 14, 2003, with the Japanese Patent Office, the entire contents of which are hereby incorporated by reference.

What is claimed is:

1. An image processing apparatus comprising:
 a decompressing unit to decompress image data having a first data compression format, the image data being formed as a code stream including a set of markers to indicate a beginning and an end of the code stream;
 an obtaining unit to obtain a second data compression format that is applicable for decompression by another image processing apparatus;
 a re-compressing unit to re-compress the decompressed image data with the second data compression format obtained by the obtaining unit;
 a transmitting unit to transmit the re-compressed image data to the other image processing apparatus; and
 a request receiving unit to receive a request from the other image processing apparatus requesting for the image data having the first data compression format;
 wherein the first data compression format is a JPEG 2000 format;
 wherein the re-compression of the decompressed image data is performed with a lossless compression scheme;
 wherein the lossless compression scheme is a JPEG/DPCM scheme;
 wherein the other image processing apparatus is operable to decompress JPEG compressed data but not to decompress JPEG 2000 compressed data.

2. The image processing apparatus as claimed in claim 1, further comprising a memory unit to store the image data having the first data compression format.

3. The image processing apparatus as claimed in claim 1, wherein the image processing apparatus and the other image processing apparatus are connected via a network.

4. The image processing apparatus as claimed in claim 1, wherein the decompressing unit can selectively decompress a part of the image data having the first data compression format.

5. The image processing apparatus as claimed in claim 1, wherein the re-compression of the decompressed image data is performed with a lossy compression scheme.

6. The image processing apparatus as claimed in claim 5, wherein the lossy compression scheme is a JPEG/DCT scheme.

7. The image processing apparatus as claimed in claim 1, wherein the re-compressing unit switches between lossless compression and lossy compression according to a prescribed condition.

8. A data decompression method comprising:
   a) decompressing image data having a first data compression format, the image data being formed as a code stream including a set of markers to indicate a beginning and an end of the code stream;
   b) obtaining a second data compression format that is applicable for decompression by another image processing apparatus;
   c) re-compressing the decompressed image data with the second data compression format obtained in b);
   d) transmitting the re-compressed image data to the other image processing apparatus; and
   e) receiving a request from the other image processing apparatus requesting for the image data having the first data compression format;
   wherein the first data compression format is a JPEG 2000 format;
   wherein the re-compression of the decompressed image data is performed with a lossless compression scheme;
   wherein the lossless compression scheme is a JPEG/DPCM scheme;
   wherein the other image processing apparatus is operable to decompress JPEG compressed data but not to decompress JPEG 2000 compressed data.

9. The data decompression method as claimed in claim 8, further comprising storing the image data having the first data compression format.

10. The data decompression method as claimed in claim 8, wherein the image processing apparatus and the other image processing apparatus are connected via a network.

11. An article of manufacture having one or more computer recordable media storing instructions thereon which, when executed by a computer having an image processing apparatus, where the image processing apparatus is in communication with another image processing apparatus, causes the computer to perform a method comprising:
   decompressing image data having a first data compression format, the image data being formed as a code stream including a set of markers to indicate a beginning and an end of the code stream;
   obtaining a second data compression format that is applicable for decompression by the other image processing apparatus;
   re-compressing the decompressed image data with the second data compression format;
   transmitting the re-compressed image data to the other image processing apparatus; and
   receiving a request from the other image processing apparatus requesting for the image data having the first data compression format;
   wherein the first data compression format is a JPEG 2000 format;
   wherein the re-compression of the decompressed image data is performed with a lossless compression scheme;
   wherein the lossless compression scheme is a JPEG/DPCM scheme;
   wherein the other image processing apparatus is operable to decompress JPEG compressed data but not to decompress JPEG 2000 compressed data.

12. The article of manufacture as claimed in claim 11, where the method further comprises storing the image data having the first data compression format.

13. The article of manufacture as claimed in claim 11, wherein the image processing apparatus and the other image processing apparatus are connected via a network.

14. The article of manufacture as claimed in claim 11, wherein decompressing image data comprises selectively decompressing a part of the image data having the first data compression format.

15. The article of manufacture as claimed in claim 11, wherein the re-compression of the decompressed image data is performed with a lossy compression scheme.

16. The article of manufacture as claimed in claim 15, wherein the lossy compression scheme is a JPEG/DCT scheme.

17. The article of manufacture as claimed in claim 11, wherein the re-compression function switches between lossless compression and lossy compression according to a prescribed condition.

* * * * *